Figure 1:
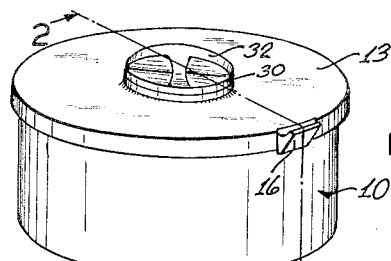

Nov. 23, 1943.    A. C. PERBAL    2,334,952
FILM DEVELOPING APPARATUS
Filed Aug. 23, 1940    3 Sheets-Sheet 1

INVENTOR.
ALBERT C. PERBAL
BY Lawrence H. Cohn
ATTORNEY.

Nov. 23, 1943.　　　A. C. PERBAL　　　2,334,952
FILM DEVELOPING APPARATUS
Filed Aug. 23, 1940　　　3 Sheets-Sheet 2

INVENTOR.
ALBERT C. PERBAL
BY Lawrence H. Cohn
ATTORNEY.

Nov. 23, 1943.   A. C. PERBAL   2,334,952
FILM DEVELOPING APPARATUS
Filed Aug. 23, 1940   3 Sheets-Sheet 3

INVENTOR.
ALBERT C. PERBAL
BY Lawrence H. Cohn
ATTORNEY.

Patented Nov. 23, 1943

2,334,952

UNITED STATES PATENT OFFICE 2,334,952

FILM DEVELOPING APPARATUS

Albert C. Perbal, University City, Mo., assignor to Harry L. Dazey, University City, Mo.

Application August 23, 1940, Serial No. 353,801

9 Claims. (Cl. 90—90.5)

This invention relates to photographic apparatus and more particularly to improvements in film developing tanks, and reels used in connection therewith.

The principal object of the invention is to provide apparatus of this character which eliminates the necessity of using a dark-room, and in other respects greatly facilitates the process of developing strips of photographic film.

This object is in part achieved by the provision of an improved reel structure that serves to hold the film in separated condition during the developing process and which functions in a novel manner to facilitate the installation of a film strip therein. A fault inherent in former reels for this purpose is the difficulty encountered in loading, aggravated by reason of the fact that such operation is required to be performed in the absence of light, with the reel disposed in a closed container or in a dark-room.

Practically all reels of prevailing type, including the one constituting a part of my improved device, are provided with spiral grooves formed in opposing end plates, the film strip being installed by impelling the same along and through the grooves. Due to the curvature of the grooves frictional forces are set up which, in former reels, retard film movement and render it exceedingly difficult to introduce any appreciable length of film strip therein. An object of the present invention is attained in a reel embodying provisions for overcoming this difficulty, which make it a superior article for use in the development of photographic film, and especially desirable in connection with a day-light loading and developing tank.

The device of my invention is formed to provide separate compartments connected by a passageway, one of such compartments serving as a film-receiving, or ante-chamber from which the film is transferred to the other compartment where the developing process is carried out. An important object of the invention resides in the provision of improved means for effecting the transition of the film from the receiving to the developing chamber while both thereof are sealed to exclude light.

A further object is attained in the provision of a reel operable in a novel manner to permit of substantially frictionless movement of the film through spiral retaining grooves during the loading operation, together with improved means for advancing film along the grooves and means for correlating the action of the reel and film advancing means, all to the end of facilitating the loading operation.

Yet another object is to provide a tank of the described character so constructed and arranged as to minimize the quantity requirements of developing and fixing solutions.

Figure 2:
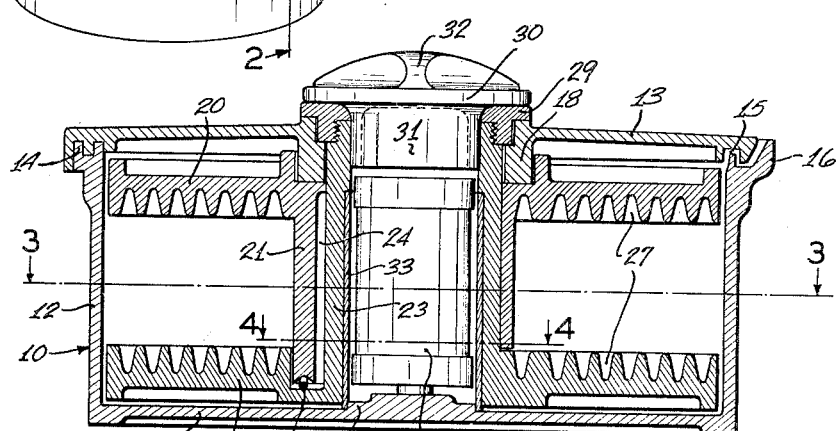
Figure 3:
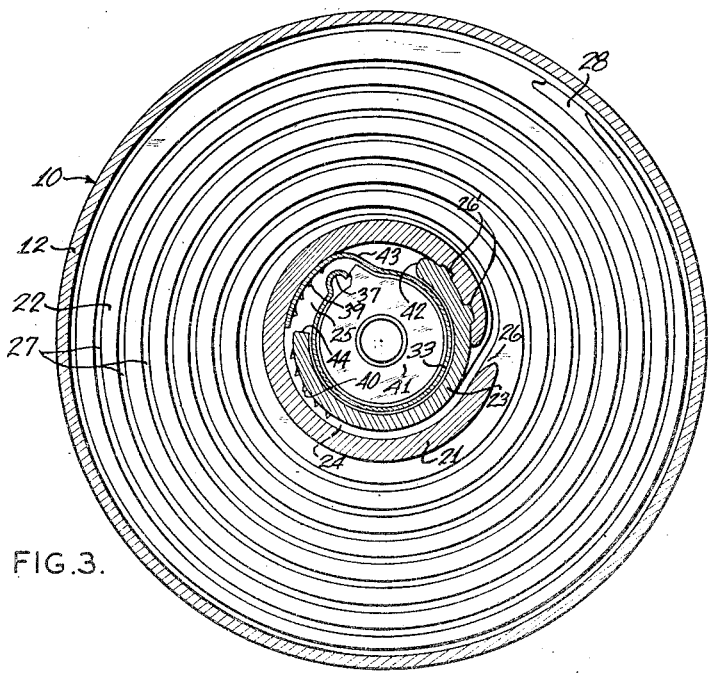
Figure 4:
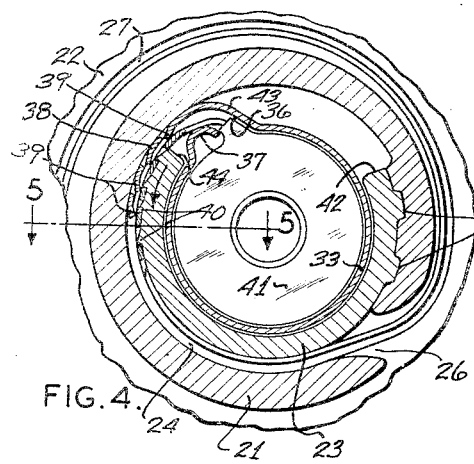
Figure 6:
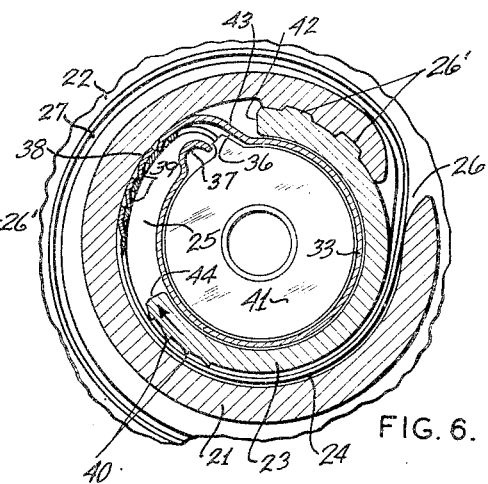
Figure 5:
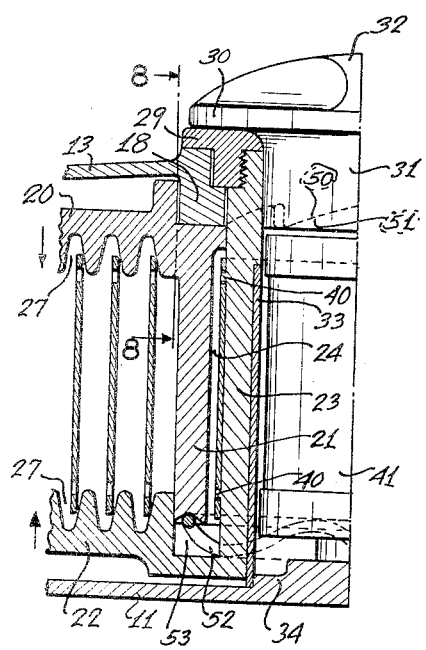
Figure 7:
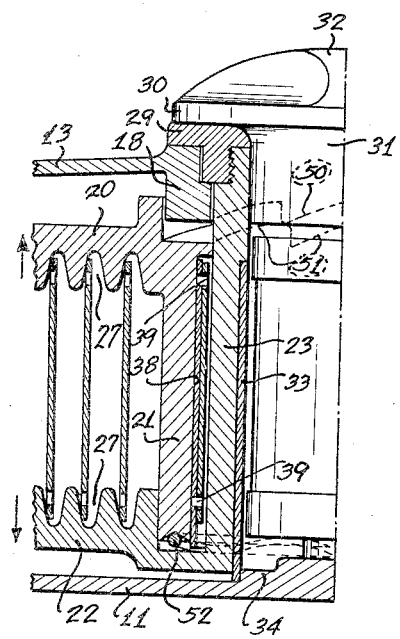
Figure 8:
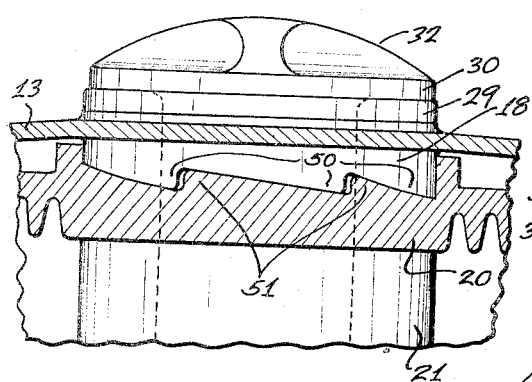
Figure 9:
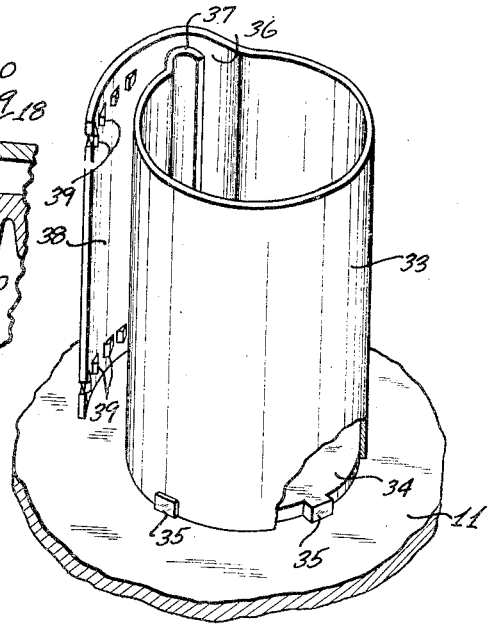
Figure 10:
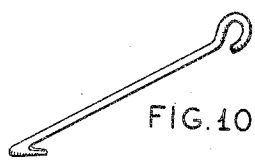
Figure 11:
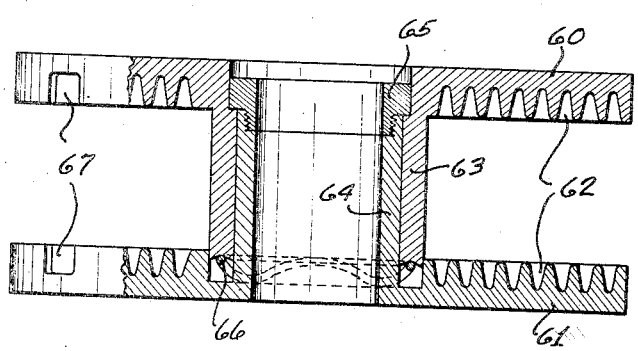

These and other objects and advantages will appear from the following detailed description of a presently preferred embodiment of my invention wherein reference is made to the accompanying drawings, Fig. 1 of which is a perspective view of a developing tank constructed in accordance with my invention; Fig. 2 is a vertical sectional view taken at line 2—2 of Fig. 1; Fig. 3 is a horizontal sectional view taken at line 3—3 of Fig. 2; Fig. 4 is a fragmentary horizontal section on an enlarged scale, taken at line 4—4 of Fig. 2; Fig. 5 is a fragmentary vertical section on an enlarged scale, taken at radial line 5—5 of Fig. 4, the relative positions of certain movable parts corresponding to their positions as shown in Fig. 4; Fig. 6 is a view similar to that of Fig. 4 but showing a different relationship of the movable parts; Fig. 7, similar to Fig. 5, shows the movable parts in relative position corresponding to that of Fig. 6; Fig. 8 is a fragmentary vertical section taken at line 8—8 of Fig. 5; Fig. 9 is a perspective view of a sleeve member which defines the film-receiving or loading chamber; Fig. 10 illustrates a simple cutting tool for severing the tail end of a film strip from its holding spool, and Fig. 11 is a vertical section through a reel of modified form embodying certain features of my invention and which may be used with any type of developing tank.

Proceeding now with the description of the developing tank illustrated in the accompanying drawings, except for certain noted exceptions the constituent parts thereof may be formed of a suitable molded opaque composition or so-called plastic. The tank body 10 is a cylindrical receptacle, completely open at its upper end and having bottom and side walls designated 11 and 12 respectively. A removable cover plate 13 seats tightly upon the upper end of the receptacle 10 and to insure that no light will enter at the junction of the receptacle and its cover these parts are formed to provide interfitting marginal portions as indicated at 14. The upper edge of wall 12 is suitably recessed at one point in the provision of a light-proof canal or drain passage 15 for developing solutions, such passage terminating at a pouring lip 16. Cover plate 13 has a circular central opening and an annular flange or rim 18 which depends from the margin of such opening.

Disposed within the tank body is a removable reel structure whose principal function it is to hold a film strip in separated condition during the developing process so that all parts of the strip may be subjected uniformly to the developing fluids. The reel comprises a pair of spaced, opposed discs each having a sleeve projecting from its center, the sleeves fitting together one within the other and combining to form the hub of the reel. Thus, referring to Fig. 2, the upper disc 20 has a depending sleeve 21 and the lower disc 22 has an upwardly projecting sleeve 23 telescopically disposed within sleeve 21. As best appears from Fig. 3 the sleeves are formed to provide an arcuate pasageway 24 that extends circumferentially therebetween, such passageway beginning at a lateral opening 25 formed in the inner sleeve 23, and terminating at a lateral opening 26 in the outer sleeve 21. By reason of the length and curvature of passageway 24 light will not be conducted therethrough. To prevent the reel parts from turning, one relative to the other, the sleeve portions 21 and 23 are provided with longitudinal, interfitting splines 26'. For purposes to be hereinafter explained the reel parts are adapted for axial movement, one relative to the other, to increase and decrease the spacing of the disc portions 20 and 22.

The inner surface of each of the discs 20 and 22 is characterized by a spiral groove 27, substantially V-shaped in section, said grooves beginning at the opening 26 in sleeve 21 and formed as continuations of passageway 24, and ending at openings 28 in the outer margins of the discs. The spiral grooves are arranged and maintained in mutual registration by the splining 26' of the sleeve portions 21 and 23.

The inner sleeve portion 23 projects upwardly beyond the upper disc 20 and into the opening in the cover plate where it is provided with screw threads for the reception of a removable collar 29. An annular flange formed on collar 29 overlies the cover plate 13 at the margins of its opening, serving to hold the reel structure in assembled relation with the cover plate and further to prevent light from entering the tank body at the crevice between sleeve 23 and cover plate 13. The opening in cover plate 13 is adapted to be closed by a removable cap 30 having a plug-like extension 31 which fits tightly within the upper end of the inner sleeve 23 of the reel. A crown portion 32 of the said cap is suitably shaped to provide gripping surfaces which facilitates its use as an element by which the reel is manipulated, as will be hereinafter more fully explained.

The described reel assembly is adapted for rotary oscillation and is journalled for such movement on a sleeve member 33 which may be formed of sheet metal and extends vertically and centrally from the bottom wall 11 of the tank body. Sleeve 33 is preferably removable from the tank body, its lower end frictionally engaging about a boss 34 formed on bottom wall 11 and being held against turning relative to the body and cover plate by the body lugs 35 which fit recesses in the lower end margin of the sleeve 33. As will appear, sleeve 33 is formed to provide a longitudinally extending opening 36 communicating with passage 24. The longitudinal margin of sleeve 33 at one side of opening 36 is formed to present a rounded surface or bead 37, and continuing from the opposite margin of the opening 36 is an arcuate lip 38 which extends circumferentially for a substantial distance beyond bead 37 and lies adjacent the inner surface of sleeve portion 21. Lip 38 is provided with two sets of ratchet teeth 39, produced as inwardly struck tongues directed toward the mouth of passage 24 and spaced to conform to the spacings of the marginal perforations customarily provided in strip film with which the said ratchet teeth are adapted to engage. Additional sets of ratchet teeth 40 are formed on the outer surface of sleeve member 23, likewise engageable with the film perforations. The teeth 39 and 40 coact to provide unidirectional driving means for the film, by which means the film is drawn from its magazine 41 disposed in the central or loading chamber, and impelled through passage 24 into and through the spiral grooves 27 in the so-called developing chamber.

From the description thus far it will appear that by removing cap 32 and the threaded collar 29 from the upper end of sleeve portion 23, the cover plate 13 and the upper reel part 20 may be disassembled from the lower reel part 22 which, with the lining sleeve 33 may remain in the tank body. In this manner the apparatus is prepared to receive the light-proof magazine containing the undeveloped film as the same is removed from a camera. To load the tank the film magazine 41 is inserted into the central chamber and the forward or pilot end of the film strip which projects outwardly of the magazine is directed through the side opening 36 in the liner sleeve 33 and along the outer surface of the sleeve 23 for engagement by ratchet teeth 40. The upper reel section 20, cover plate 13, threaded collar 29, and cap 30 are then replaced, rendering the interior of the tank light-proof. It will be understood that the foregoing operations may be accomplished in the presence of light since only the pilot end of the film strip is exposed. It will also be understood that the assembly comprising reel parts 20 and 22, threaded collar 29, and cap 32 may be oscillated, as a unit, relative to the tank body 10, cover plate 13 and liner sleeve 33 which may be regarded as a stationary unitary assembly. In the present embodiment the range of relative angular movement of the aforesaid assembly units is limited to approximately 100 degrees, movement of the reel unit in a so-called forward direction (anti-clockwise Fig. 3) being limited by the abutment of sleeve margin 42 against the shoulder 43 formed on lip 38, and movement of the reel unit in the reverse direction being limited by the abutment of sleeve margin 44 against the bead 37.

Oscillation of the heel unit is effected through the cap 30 used as a manipulating element. With each forward stroke of the reel unit film is drawn out of the magazine, this by reason of the driving engagement of ratchet teeth 40 with the film perforations. With each backward stroke of the reel unit the film progresses through passage 24 and the spiral grooves 27, the film being prevented from moving backwardly as the reel is so moved by reason of the stationary ratchet teeth 39 which act as detents. Oscillation of the reel unit is continued until the film becomes fully established in the spiral grooves of the developing chamber, such condition being attained and manifest to the operator when forward rotation of the reel unit is checked by the tail end of the film strip which is customarily attached to its spool, inside of the magazine. The cap element 30 may now be removed without danger of the film becoming light struck since only the unsensitized tail of the film will be exposed to light that enters the central or loading chamber.

By means of a hooked cutting element such as is illustrated in Fig. 10, the film strip may be severed from the magazine adjacent the opening 36 in the lining sleeve 33 and the now empty magazine removed from the loading chamber. Thereafter developing solution is introduced through the central opening to completely fill the tank body and after the lapse of suitable developing time the solution is removed through drain passage 15. In like manner washing water and fixing solution are introduced and removed from the tank, after which the tank may be disassembled to permit of the removal of the fully developed film strip and the thorough cleaning and drying of the component tank parts.

From the preceding description it will appear that the action of the ratchet teeth 39 and 40 is such as to cause the film strip, in effect, to be pushed intermittently into and through the spiral grooves of the reel. Since the film is required to slide against the curved surfaces of the reel grooves there is a tendency for the film to bind, due to the frictional forces set up between it and the groove surfaces.

Such frictional forces are accumulative, the deterring effect thereof on the film increasing greatly as the film advances through the grooves. As a consequence considerable difficulty has heretofore been experienced in connection with the loading of film reels of the general character described, whether such reels are designed to be loaded directly by hand or otherwise, and in most instances the forward progress of the film strip is checked before any substantial or desired length thereof has been installed in the reel. An important object of the present invention is attained by the provision of a reel which functions in a manner to nullify these adverse tendencies.

As has been previously indicated the paired reel parts 20 and 22 are adapted for relative movement, one toward and from the other. Such movement is effected, in the present example, by the provision of three cams 50 formed on and spaced equidistantly about the lower extremity of the cover plate collar 18, and the provision of three cams 51, each arranged to coact with one of the cams 50, formed on the upper extremity of the reel sleeve 21. These cams are appropriately shaped so that as the entire reel assembly is turned in a counterclockwise direction relative to the body assembly (the film moving with the reel), the stationary cams 50 exert a downward force on the upper reel part, depressing the same toward the lower reel part. Such relative movement of the reel parts 20 and 22 is opposed by a spring 52 which is seated in an annular channel 53 subtending the sleeve portion 21 and bearing upwardly against the lower end surface thereof. Consequently, as the reel assembly is turned clockwise, (the reel then moving relative to the film which is caused to advance along the spiral grooves), the upper end part 20 moves upwardly away from the lower reel part 21 under the action of spring 52.

As will be understood, the tendency of the film to bind in the spiral grooves occurs only during the later strokes, or when the film is being moved progressively along the grooves relative thereto. In my improved reel such movement is accompanied by a gradual recessional movement of the upper reel part which, of itself, tends to alleviate the grasping or deterring action of the reel on the film. Moreover, and because the grooves are V-shaped in section, the relative diverging movement of the reel parts operates to increase the effective width of the grooves which further conduces toward free movement of the film therein. The aforesaid movement of the upper reel part toward and from its companion is limited in extent to less than the groove depth and hence the film will at all times remain within the environs of the grooves.

While I have shown and described my improved reel as an element of a developing tank especially designed for daylight loading it will be understood that reels embodying my improving features, namely, the ability of the grooved end plates to be moved toward and from each other during the loading operation for purposes of nullifying binding tendencies, may be employed in other types of developing tanks as well. For example, there is shown in Fig. 11 a reel structure comprising opposed end plates 60 and 61 having spiral grooves 62 formed in their inner faces. The upper plate 60 has a sleeve portion 63 which is adapted for axial sliding movement on sleeve portion 64 of lower plate 61. Relative turning movement of the plates is prevented by splining, not shown, and a collar 65 threaded on the upper end of sleeve portion 64 holds the parts in assembled relation and forms an abutment for the sleeve portion 63 to limit the extent of its outward movement. A suitable spring 66 compressed between the lower end of sleeve portion 63 and the lower plate 61 acts to hold the end plates in maximum spaced relation. To load the reel shown in Fig. 11 the film is inserted into the grooves through the openings 67 at the outer periphery of the end plates. By manipulating the plates to cause them to be moved toward and from each other as the film is being pushed through the grooves, binding of the film is eliminated. The reel of Fig. 11 must be loaded in a dark-room, but may be used with practically any type of receptacle for the developing solution.

I have described my invention with reference to several embodiments thereof, but it should be understood that various changes may be made in the means herein set forth without departing from the spirit and full intendment of the invention as defined by the appended claims.

I claim as my invention:

1. In a film developing tank, a container having a tubular stub shaft projecting upwardly from its bottom wall and providing a film chamber, a reel disposed for rotational oscillation on said stub shaft, lateral openings in said stub shaft and the hub of said reel defining a film passage connecting said chamber and the space outside of the reel hub, ratchet teeth formed on said reel hub and said stub shaft, said ratchet teeth facing in the same direction and being adapted to engage film at perforations therein and to effect unidirectional movement of film through said passage when the reel is oscillated.

2. In a film developing tank, a container, a reel in said container comprising a hollow hub portion providing a film-receiving chamber and opposed, spirally grooved end plates, one of said end plates being adapted for movement toward and from the other and the reel being rotatively oscillatable as a unit, in the container, a film passage extending laterally through the hub portion of the reel and connecting said film-receiving chamber with the inner ends of said spiral grooves, means operable by the oscillation of said reel to move film outwardly from said chamber, through said passage and into said spiral grooves, and means for moving one of said reel end plates toward and from the other as the film is moved through said grooves.

3. In a film developing tank, a container, a reel therein comprising opposed discs having spiral film-retaining grooves formed in their confronting surfaces and a hollow hub portion providing a film-receiving chamber, said hub portion having a lateral passage connecting said chamber with the inner ends of said spiral grooves, one of said reel discs being adapted for movement toward and from the other, means for moving film from said chamber through said passage and into said spiral grooves, and means operatively connected to the first said means for effecting axial displacement of one of the reel plates relative to the other as the film is being moved into the spiral grooves by the first said means.

4. In a film developing tank, a receptacle, a film reel therein, said reel including grooved, film-receiving plates adapted for axial relative movement, toward and away from each other, and means for moving film through the grooves of said reel and simultaneously moving said reel plates toward and away from each other as aforesaid, while the reel is disposed within said receptacle.

5. In a film developing tank, a receptacle, a film reel therein, said reel comprising opposed end-plates having spiral film-receiving grooves of V-section formed in their confronting faces, said end plates being adapted for limited relative movement toward and from each other during installation of a film in said grooves to facilitate that operation, and means for installing film in said grooves and for effecting relative movement of said reel end plates toward and from each other while said reel is disposed in said receptacle.

6. In a film developing tank, a receptacle, a film reel therein, said reel having a hollow hub portion to accommodate film, and opposed plates having spiral film-receiving grooves communicating with the interior of said hub portion, said plates being adapted for relative movement toward and from each other to facilitate installation of film in said grooves, and means for moving film out of said hub portion and through said grooves, and at the same time moving said reel plates, relatively toward and from each other, while said reel is light-sealed within said receptacle.

7. In a film developing tank, a receptacle, a film reel therein, said reel having a hollow hub portion providing a film loading chamber, an opening in said receptacle communicating with said loading chamber, a removable closure element for said opening, said reel having spaced end plates having spiral, V-sectioned film-receiving grooves leading from said loading chamber, said plates being relatively movable toward and from each other to facilitate installation of film in said grooves, and means for moving film out of said loading chamber and through said grooves and simultaneously moving said reel plates as aforesaid, while said reel is light-sealed within said enclosure.

8. In a film developing tank, a receptacle, a removable film reel therein, said reel having a hollow hub portion to accommodate film, an opening in said receptacle communicating with the interior of said reel hub, a removable closure element for said opening, said reel having end plates adapted for relative movement toward and away from each other, opposed spiral grooves of V-section formed in the inner surfaces of said reel plates, said reel hub having a lateral opening connecting its interior with the inner ends of said grooves, a member for oscillating said reel to effect the transfer of film from the reel hub to a position within said reel grooves, and means operable in response to reel oscillation, for effecting relative movement of the reel plates toward and away from each other, whereby to facilitate installation of the film in said reel grooves.

9. In a film developing tank, a receptacle, a film reel therein, said reel including a pair of opposed discs arranged for relative movement toward and from each other, said discs having film-receiving channels formed in their confronting faces, means for moving film in and along said channels to load the reel while said reel is disposed in the receptacle, means for moving said discs toward and from each other during the aforesaid loading operation, and means limiting the extent of relative disc movement to less than the depth of one of said channels.

ALBERT C. PERBAL.